(12) United States Patent
Huang et al.

(10) Patent No.: US 8,982,074 B2
(45) Date of Patent: Mar. 17, 2015

(54) SCAN METHOD FOR A TOUCH PANEL (75) Inventors: Jung-Shou Huang, Zhubei (TW); Chia-Mu Wu, Taipei (TW); Tse-Lun Hung, Taipei (TW); Shun-Yi Chen, Taoyuan (TW)

(73) Assignee: Elan Microelectronics Corporation, Hsin Chu (TW)

( * ) Notice: Subject to any disclaimer, the term of this patent is extended or adjusted under 35 U.S.C. 154(b) by 204 days.

(21) Appl. No.: 13/542,474

(22) Filed: Jul. 5, 2012

(65) Prior Publication Data

US 2013/0181916 A1 Jul. 18, 2013

(30) Foreign Application Priority Data

Jan. 10, 2012 (TW) .............................. 101100919 A (51) Int. Cl.
*G06F 3/041* (2006.01)
*G06F 3/044* (2006.01)

(52) U.S. Cl.
CPC ...... *G06F 3/044* (2013.01); *G06F 2203/04104* (2013.01); *G06F 3/0418* (2013.01)
USPC .......................................... 345/173; 345/178

(58) Field of Classification Search
CPC .................. G06F 3/044; G06F 3/0418; G06F 2203/04104
USPC .................... 345/156–184; 178/18.01–18.06, 178/19.01–19.06
See application file for complete search history.

(56) References Cited

U.S. PATENT DOCUMENTS

| | | | |
|---|---|---|---|
| 8,659,566 B2 * | 2/2014 | Liu et al. ........................ | 345/173 |
| 8,773,146 B1 * | 7/2014 | Hills et al. ..................... | 324/658 |
| 2004/0156168 A1 * | 8/2004 | LeVasseur et al. ............ | 361/681 |
| 2007/0233351 A1 * | 10/2007 | Wang ............................. | 701/70 |
| 2008/0218487 A1 * | 9/2008 | Huang et al. .................. | 345/173 |
| 2008/0308323 A1 * | 12/2008 | Huang et al. .................. | 178/18.06 |
| 2009/0032312 A1 * | 2/2009 | Huang et al. .................. | 178/18.06 |
| 2009/0244029 A1 * | 10/2009 | Huang et al. .................. | 345/174 |
| 2010/0110037 A1 * | 5/2010 | Huang et al. .................. | 345/174 |
| 2010/0170726 A1 * | 7/2010 | Yeh et al. ...................... | 178/19.03 |
| 2010/0177059 A1 * | 7/2010 | Wang et al. ................... | 345/174 |
| 2010/0328262 A1 * | 12/2010 | Huang et al. .................. | 345/174 |
| 2011/0115743 A1 * | 5/2011 | Wang et al. ................... | 345/174 |
| 2011/0157069 A1 * | 6/2011 | Zhuang et al. ................ | 345/174 |
| 2011/0205849 A1 * | 8/2011 | Kang ............................. | 368/10 |
| 2011/0221706 A1 * | 9/2011 | McGibney et al. ........... | 345/175 |
| 2011/0261005 A1 * | 10/2011 | Joharapurkar et al. ....... | 345/174 |
| 2012/0043471 A1 * | 2/2012 | Harpring et al. .............. | 250/394 |
| 2012/0044199 A1 * | 2/2012 | Karpin et al. ................. | 345/174 |
| 2012/0098757 A1 * | 4/2012 | Samadani et al. ............ | 345/173 |
| 2012/0113028 A1 * | 5/2012 | Marsden et al. .............. | 345/173 |
| 2012/0139849 A1 * | 6/2012 | Syu et al. ...................... | 345/173 |
| 2012/0169660 A1 * | 7/2012 | Seo ................................ | 345/174 |
| 2012/0306806 A1 * | 12/2012 | Yang et al. .................... | 345/174 |
| 2013/0002599 A1 * | 1/2013 | Townsley et al. ............. | 345/174 |
| 2013/0093712 A1 * | 4/2013 | Liu et al. ....................... | 345/174 |
| 2013/0215047 A1 * | 8/2013 | Wu et al. ....................... | 345/173 |
| 2014/0049270 A1 * | 2/2014 | Chang et al. .................. | 324/658 |

\* cited by examiner

Primary Examiner — Prabodh M Dharia
(74) Attorney, Agent, or Firm — patenttm.us (57) ABSTRACT

A scan method for a touch panel has steps of: receiving a self-sensing frame; calculating sensing slopes between each sensing line and its neighboring sensing lines in the self-sensing frame; determining whether any sensing slope is larger than a slope threshold, and marking the sensing line if the sensing slope is larger than the slope threshold; and executing a mutual scan approach on the marked sensing lines to produce a mutual sensing frame without sensing point caused by noise. Further, the present invention also increases the frame rate since only a part of sensing lines need to be scanned.

8 Claims, 7 Drawing Sheets

SCAN METHOD FOR A TOUCH PANEL

BACKGROUND OF THE INVENTION

1. Field of the Invention

This invention relates to a mutual scan method for a touch panel, in particular to a mutual scan method for increasing mutual sensing frame rates and preventing interference resulting from noises.

2. Description of Related Art

Scan methods for a capacitive touch panel include a mutual scan approach and a self scan approach. The two approaches are able to recognize touch objects respectively based on information of mutual sensing frames and self sensing frames.

The touch objects are recognized according to sensing capacitance variation values at the positions where the touch objects are present. Because the capacitive touch panel recognizes the touch objects based on the capacitance variation values of column sensing lines and row sensing lines, the touch panel is easily interfered by environment noises so that the accuracy for identifying touch objects is degraded. The environment noises may be AC noise, LCM noise, etc.

Figure 7A:
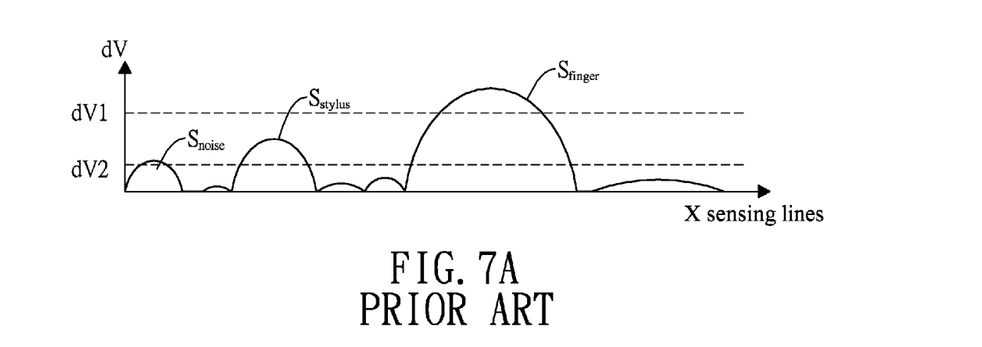
FIG. 7A show sensing signals of a capacitive touch panel.
Figure 7B:
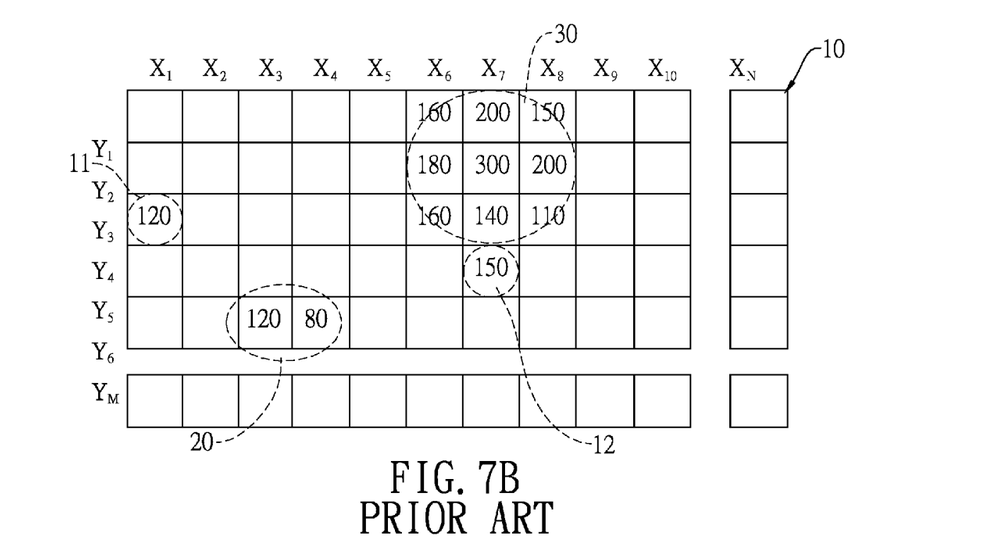
FIG. 7B is a mutual sensing frame corresponding to FIG. 7A.

After the touch panel performs the self scan approach, a waveform of a sensing signal produced by sensing lines X1~XN in one axis of the touch panel is shown in FIG. 7A. The sensing signal comprises a low sensitivity touch signal $S_{stylus}$ (produced by a stylus 20 with a small diameter), a noise sensing signal $S_{noise}$ (induced by AC noise 11 or LCM noise 12) and a high sensitivity touch signal $S_{finger}$ (produced by a finger 30 or a stylus with a large diameter). With reference to FIG. 7B, after the touch panel executes the mutual scan approach, a mutual sensing frame 10 also has information of the AC noise $S_{noise}$, the high sensitivity touch signal $S_{finger}$ and the low sensitivity touch signal $S_{stylus}$ as shown in FIG. 7A.

With reference to FIG. 7A, a capacitance sensing value of the high sensitivity touch signal $S_{finger}$ is larger than those of the low sensitivity touch signal $S_{stylus}$ and the noise sensing signal $S_{noise}$. The touch object with the high sensitivity touch signal $S_{finger}$ can be recognized easily. By setting a sensing threshold dV1, the presence of the touch object is confirmed if the sensing value is larger than the sensing threshold dV1. However, when the capacitive touch panel is touched by the stylus 20, the low sensitivity touch signal $S_{stylus}$ is generated and smaller than the sensing threshold dV1. The touch object of the stylus 20 cannot be recognized. If the original sensing threshold dV1 is decreased to a new sensing threshold dV2, the noise sensing signal $S_{noise}$ will be recognized as a touch object incorrectly according to the new sensing threshold dV2.

SUMMARY OF THE INVENTION

An objective of the present invention is to provide a scan method for a touch panel for reducing interferences resulting from the AC noises, LCM noises, etc.

To achieve the objective, the scan method of the present invention comprises:
  receiving a self-sensing frame;
  calculating sensing slopes between each sensing line and its neighboring sensing lines in the self-sensing frame;
  determining whether any sensing slope is larger than a slope threshold, and marking the sensing line if the sensing slope is larger than the slope threshold; and
  executing a mutual scan approach on the marked sensing lines to produce a mutual sensing frame.

By setting a slope threshold higher than that of the noise sensing signal, driving lines corresponding to the noise sensing signal will not be marked before the mutual scan. Thus, the mutual sensing frame will exclude the noise sensing points. Because only a part of driving lines will be driven in the mutual scan, the frame rate of the mutual scan is increased.

DETAILED DESCRIPTION OF PREFERRED EMBODIMENT

Figure 1:
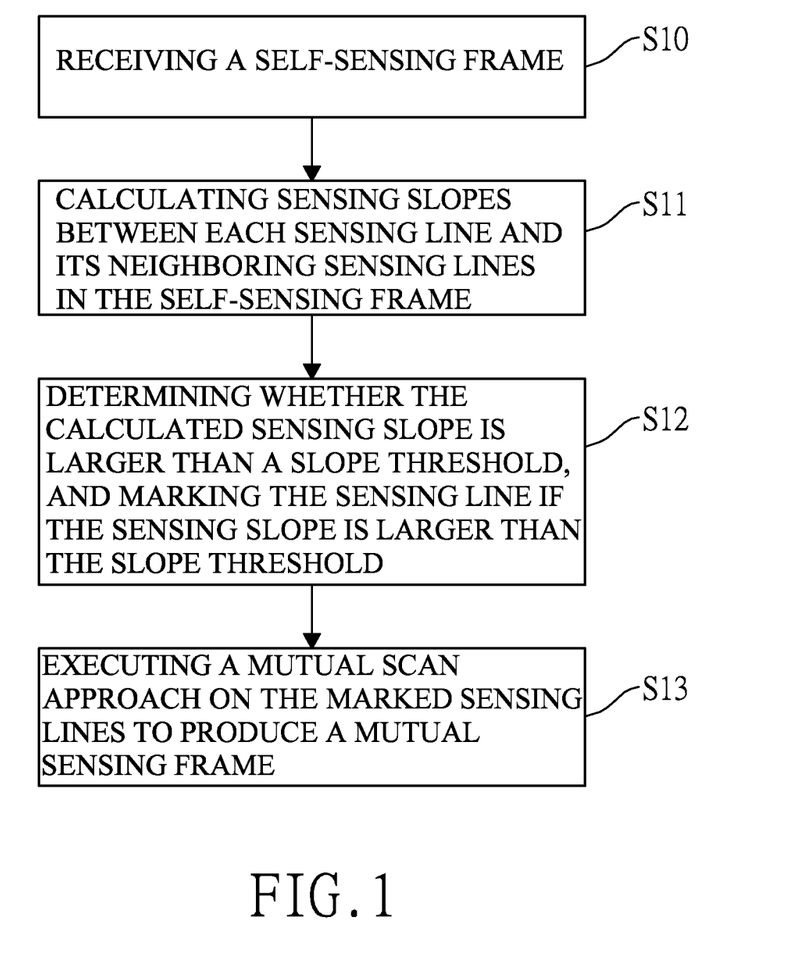
FIG. 1 is a flowchart of a first embodiment of a mutual scan method in accordance with the present invention.

With reference to FIG. 1, a mutual scan method for a touch panel in accordance with a first embodiment of this invention comprises the steps of:
  receiving a self-sensing frame (S10);
  calculating sensing slopes between each sensing line and its neighboring sensing lines from the self-sensing frame (S11);
  determining whether any sensing slope is larger than a slope threshold, and marking the sensing line if the sensing slope is larger than the slope threshold (S12); and
  executing a mutual scan approach on the marked sensing lines to obtain a mutual sensing frame (S13).

Figure 2:
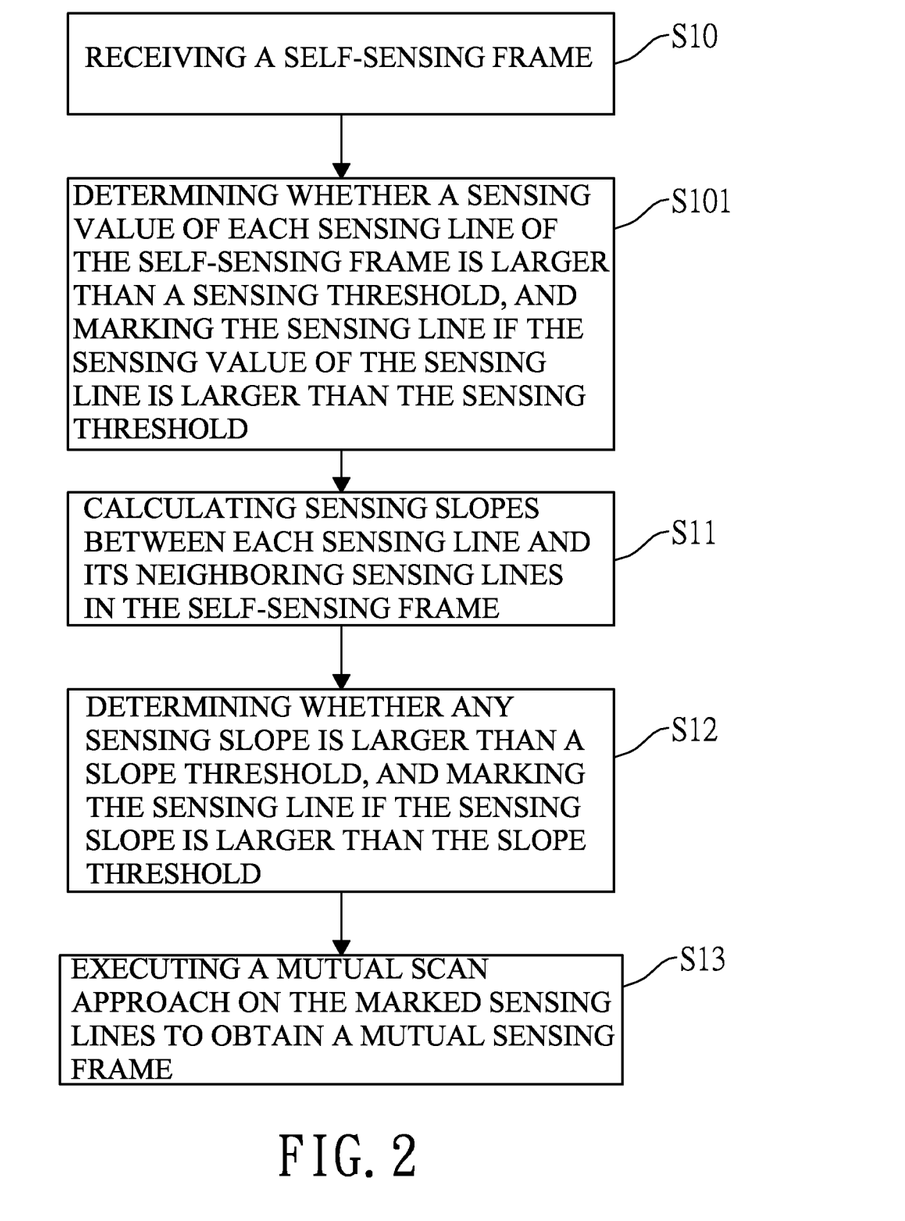
FIG. 2 is a flowchart of a second embodiment of a mutual scan method in accordance with the present invention.

With reference to FIG. 2, a second embodiment of the mutual scan method for a touch panel comprises the steps of:
  receiving a self-sensing frame (S10);
  determining whether a sensing value of each sensing line of the self-sensing frame is larger than a sensing threshold, and marking the sensing line if the sensing value of the sensing line is larger than the sensing threshold (S101);
  calculating sensing slopes between each sensing line and its neighboring sensing lines from the self-sensing frame (S11);
  determining whether any sensing slope is larger than a slope threshold, and marking the sensing line if the sensing slope is larger than the slope threshold (S12); and
  executing a mutual scan approach on the marked sensing lines to obtain a mutual sensing frame (S13).

Figure 3A:
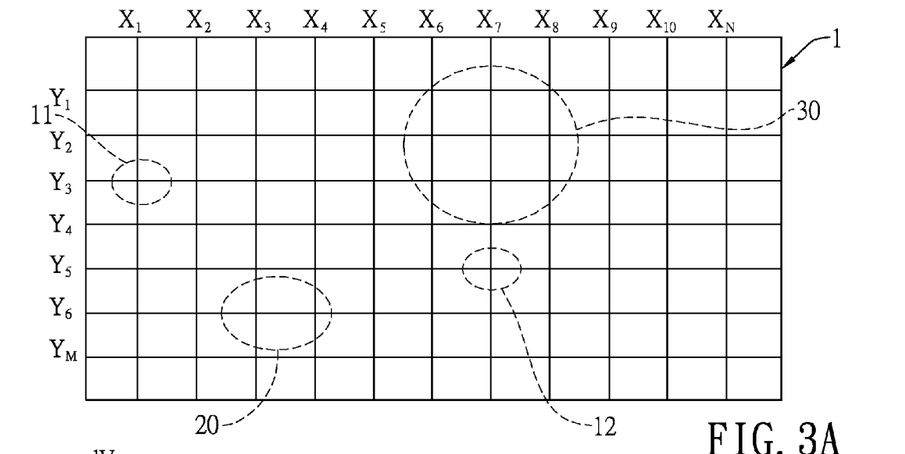
FIG. 3A is a schematic view of a capacitive touch panel.

With reference to FIG. 3A, a capacitive touch panel 1 is interfered by AC noises 11 and LCM noises 12, and touched by a finger 30 and a stylus 20. After executing the self scan, a self-sensing frame is obtained. The self-sensing frame includes first sensing signals in a first axis direction and second sensing signals in a second axis direction. The first and second sensing signals respectively correspond to the first axis sensing lines $X_1$ to $X_N$ and the second axis sensing lines $Y_1$ to $Y_M$. In this embodiment and subsequent descriptions, the first axis sensing lines are those denoted by $X_1$~$X_N$ and the second axis sensing lines are those denoted by $Y_1$ to $Y_M$ for illustrative purpose. It is noted that the first axis sensing lines and the second axis sensing lines can be exchanged to be denoted by $Y_1$ to $Y_M$ and $X_1$ to $X_N$ respectively.

Figure 3B:
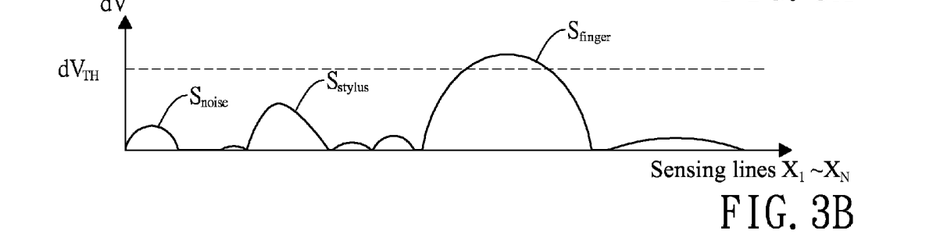
FIG. 3B shows sensing signals of first axis sensing lines generated by performing a self-scan on the touch panel of FIG. 3A.

In the step S10, the self-sensing frame of the capacitive touch panel 1 is received. As shown in FIG. 3B, the sensing signals of the first axis sensing lines $X_1$ to $X_N$ are obtained from the self-sensing frame. The sensing signals of the first axis sensing lines $X_1$ to $X_N$ include a low sensitivity touch signal $S_{stylus}$ corresponding to the stylus 20, a noise sensing signal $S_{noise}$ corresponding to both the AC noise and the LCM noise, and a high sensitivity touch signal $S_{finger}$ corresponding to the finger 30.

In the step S101, the sensing value of each sensing line $X_1$ to $X_N$ is compared with the sensing threshold $dV_{TH}$. The sensing line will be marked if its sensing value is larger than the sensing threshold $dV_{TH}$.

Figure 3C:
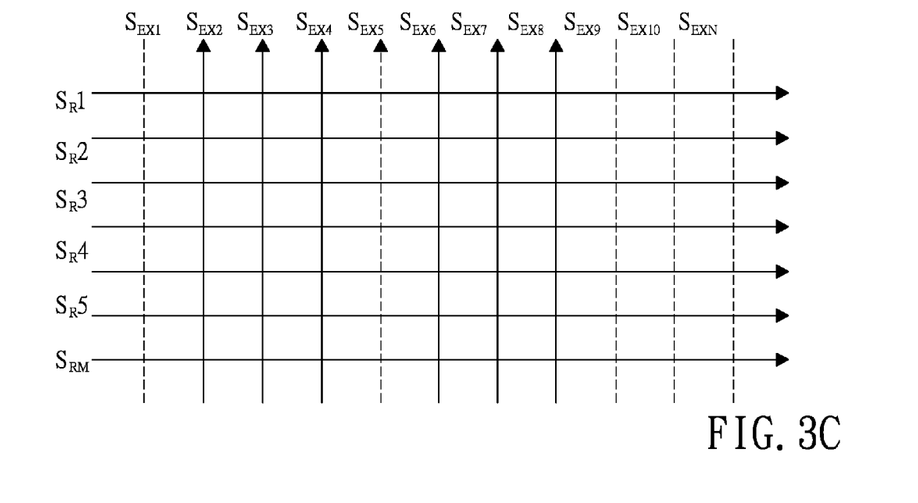
FIG. 3C is a schematic diagram of marked driving lines corresponding to FIG. 3A.

With reference to FIG. 3A and FIG. 3C, when the touch panel executes the mutual scan, the first axis sensing lines $X_1$ to $X_N$ are respectively defined as driving lines $S_{EX1}$ to $S_{EXN}$, and the second axis sensing lines $Y_1$ to $Y_M$ are respectively defined as receiving lines $S_{R1}$ to $S_{RM}$. In the step S101, because the sensing value of the first axis sensing line $X_7$ is larger than the sensing threshold $dV_{TH}$, the driving line $S_{EX7}$ corresponding to the first axis sensing line $X_7$ is marked and indicated by a solid line in FIG. 3C.

In the step S11, the sensing slope of each first axis sensing lines X1-X7 in comparison to its neighboring first axis sensing lines X1-X7. The sensing slope means an absolute value of a sensing value difference between two adjacent sensing lines. For example, the sensing slope of a first axis sensing line $X_n$ and its neighboring first axis sensing line $X_{n-1}/X_{n+1}$ can be represented by $|X_{n-1}-X_n|$ or $|X_n-X_{n+1}|$. In the step S12, each calculated sensing slope is compared with the slope threshold, i.e. determining if either $|X_{n-1}-X_n|$ or $|X_n-X_{n+1}|$ is larger than the slope threshold. For example, three first axis sensing lines $X_2$, $X_3$ and $X_4$ correspond to the low sensitivity touch signal $S_{stylus}$. With reference to FIGS. 3A and 3B, when comparing the first axis sensing lines $X_2$, $X_3$ and $X_4$ with their adjacent sensing lines $X_3$, $X_2$ and $X_4$, and $X_3$, the sensing slopes of the three first axis sensing lines $X_2$, $X_3$ and $X_4$ are all larger than the slope threshold. Therefore, the three driving lines $S_{EX2}$, $S_{EX3}$ and $S_{EX4}$ corresponding to the three sensing lines $X_2$, $X_3$ and $X_4$ are marked as solid lines in FIG. 3C.

Furthermore, after comparing the two first axis sensing lines $X_6$ and $X_8$ with their adjacent sensing lines $X_5$, $X_7$ and $X_9$, it is found that the sensing slopes of the two first axis sensing lines $X_6$ and $X_8$ are larger than the slope threshold. Therefore, the two driving lines $S_{EX6}$ and $S_{EX8}$ corresponding to the first axis sensing lines $X_6$ and $X_8$ are marked as solid lines in FIG. 3C.

After the steps S10, S101, S11 and S12, the driving lines $S_{EX2}$, $S_{EX3}$, $S_{EX4}$, $S_{EX6}$, $S_{EX7}$ and $S_{EX8}$ corresponding to the low sensitivity touch signal $S_{stylus}$ and the high sensitivity touch signal $S_{finger}$ are marked.

Figure 4:
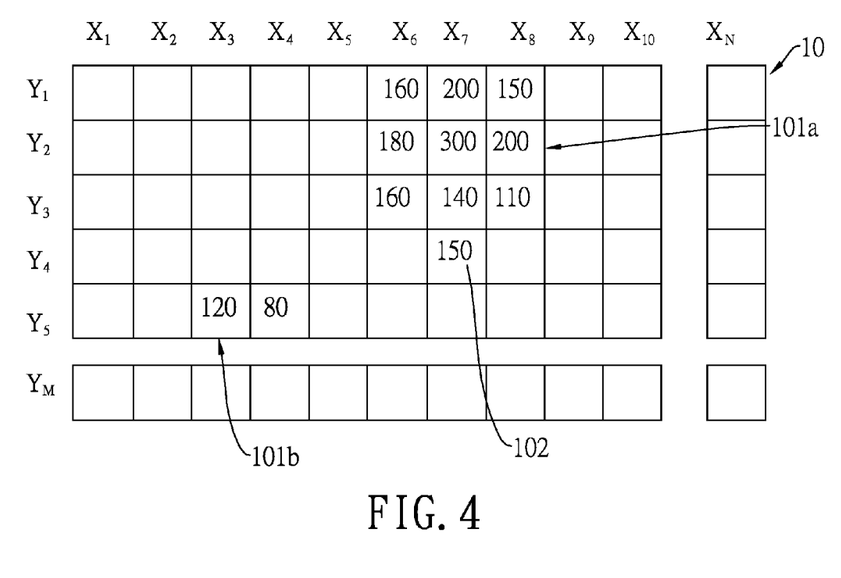
FIG. 4 is a mutual sensing frame generated by a mutual scan in accordance with the invention.

In the step S13, a mutual scan is executed on the marked driving lines $S_{EX2}$, $S_{EX3}$, $S_{EX4}$, $S_{EX6}$, $S_{EX7}$ and $S_{EX8}$ to obtain a mutual sensing frame 10 as shown in FIG. 4. Because the noise sensing signal $S_{noise}$ resulting from the AC noise 11 corresponds to an unmarked driving line $S_{EX1}$ that is not scanned, a sensing point of the noise sensing signal $S_{noise}$ is filtered and disappears in the mutual sensing frame 10.

Since another noise sensing signal $S_{noise}$ resulting from the LCM noise 12 is located on the sensing line $X_7$ corresponding to the high sensitivity touch signal, the noise sensing signal $S_{noise}$ will be scanned and exist in the mutual sensing frame 10 as a sensing point. The sensing value of the LCM noise sensing point 102 may be higher than or equal to the sensing value of a low sensitivity touch object. If the sensing threshold of the mutual sensing frame 10 is adjusted to a new lower sensing threshold such as 120 for identifying the low sensitivity touch object, the LCM noise sensing point 102 will be incorrectly recognized as a valid sensing point. For example, if the sensing threshold is reduced to 120, the LCM noise sensing point 102 with the sensing value 150 will be regarded as a touch object. The number of touch objects will be incorrectly calculated to three.

Figure 5:
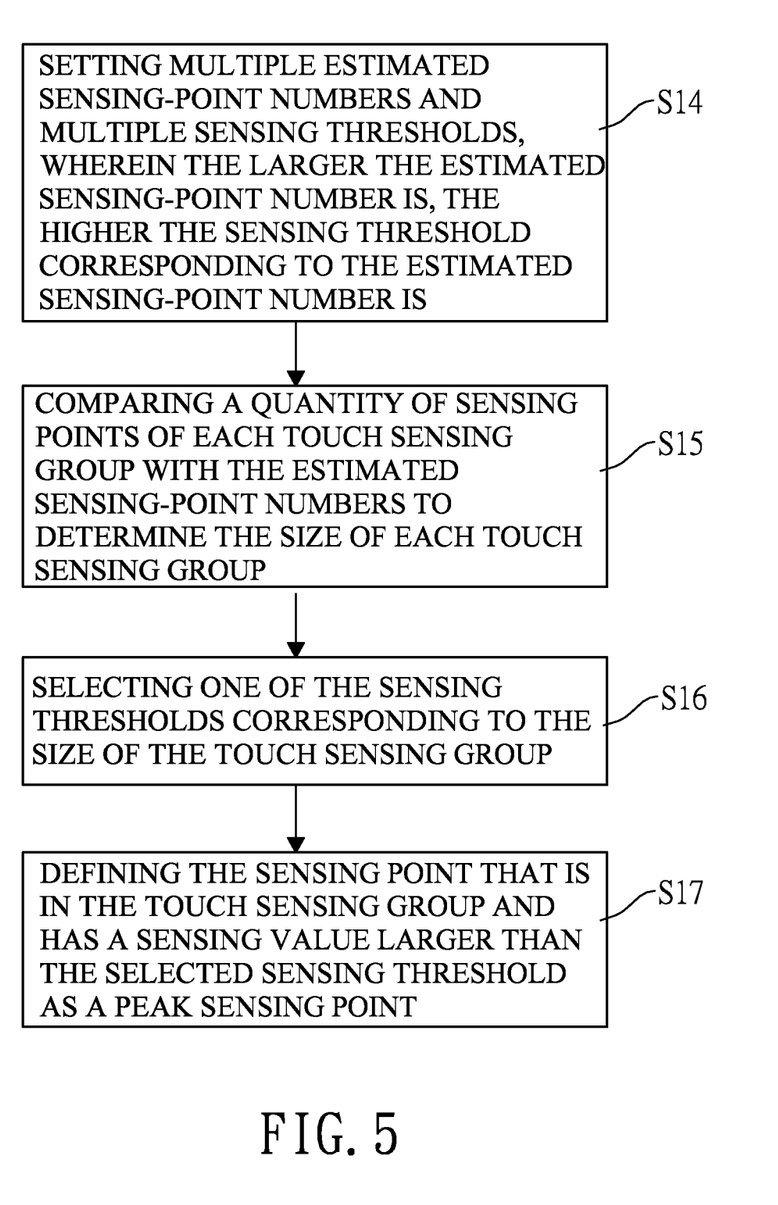
FIG. 5 is a flowchart showing a part of steps in a third embodiment of a mutual scan method in accordance with the present invention.

In order to eliminate the noise sensing point 102 adjacent to the high sensitivity touch signal or the low sensitivity touch signal from the mutual sensing frame, a size of each touch sensing group in the mutual sensing frame 10 will be further considered. In other words, according to the sizes of the touch sensing groups, different sensing thresholds will be designated for the touch sensing groups respectively. A larger touch sensing group corresponds to a higher sensing threshold. After the step S13, the method of the present invention further comprises the steps of:

setting multiple estimated sensing-point numbers and multiple sensing thresholds, wherein the larger the estimated sensing-point number is, the higher the sensing threshold corresponding to the estimated sensing-point number is (S14);

comparing a number of sensing points of each touch sensing group with the estimated sensing-point numbers to determine the size of each touch sensing group (S15);

selecting one of the sensing thresholds corresponding to the size of the touch sensing group (S16); and defining the sensing point that is in the touch sensing group and has a sensing value larger than the selected sensing threshold as a peak sensing point (S17).

With reference to FIG. 4, the mutual sensing frame 10 comprises a finger touch sensing group 101a and a stylus touch sensing group 101b. The finger touch sensing group 101a is larger than the stylus touch sensing group 101b in size, so the finger touch sensing group 101a corresponds to a higher sensing threshold value such as 200. Comparing the sensing threshold value 200 with all sensing points in the finger touch sensing group 101a, only the sensing point in center with the sensing value 300 is higher than the sensing threshold value 200. Because the LCM noise sensing point 102 has a lower sensing value 150 than the sensing threshold value 200, the LCM noise sensing point 102 will not be deemed as a peak sensing point. Since the stylus touch sensing group 101b includes fewer sensing points than the finger touch sensing group 101a, the stylus touch sensing group 101b corresponds to a lower sensing threshold such as 120 and has a peak sensing point. With the different sensing thresholds, the invention can recognize the peak sensing points for different touch objects.

Figure 6:
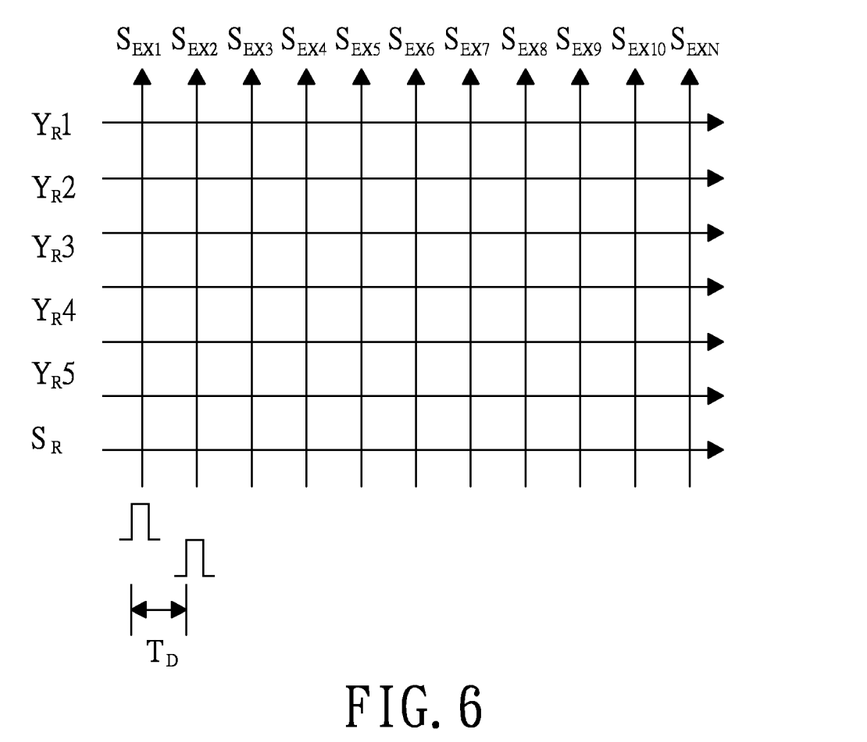
FIG. 6 is schematic diagram of a conventional mutual scan.

With reference to FIG. 6, a mutual sensing frame is generated by the mutual scan approach. According to the mutual scan approach, driving signals are sequentially output to the driving lines $S_{EX1}$~$S_{EXN}$ per period of time $T_D$, and feedback signals are received from the receiving lines $S_{R1}$~$S_{RM}$. A minimum scanning time of the mutual sensing frame is $T_{FRAME}=A(N*T_D)$, wherein A represents the number of scanning times executed on each driving line and N is a total number of the driving lines.

With further reference to FIG. 3C, with the steps as disclosed in FIG. 1 or FIG. 2, only six driving lines $S_{EX2}$, $S_{EX3}$, $S_{EX4}$, $S_{EX6}$, $S_{EX7}$ and $S_{EX8}$ should be driven. The minimum scanning time of the mutual sensing frame is $T_{FRAME}=A$ ($6*T_D$). Comparing with conventional mutual scan method, the mutual scan method of this invention generates the sensing frame in a shorter time and increases the sensing frame rate.

To summarize, the invention can recognize driving lines corresponding to the noise sensing signal by setting a slope threshold which is higher than a slope of the noise sensing signal. When a mutual scan is executed, the driving lines corresponding to the noise sensing signals are ignored. The mutual sensing frame will exclude the noise sensing points. Because only a part of driving lines will be driven in the mutual scan, the frame rate of mutual scan is increased.

What is claimed is:

1. A scan method for a touch panel with plural sensing lines comprising the steps of:
   receiving a self-sensing frame with plural sensing values of the sensing lines obtained by performing a self scan on the touch panel;
   calculating a sensing slope between each sensing line of the touch panel and its neighboring sensing lines in the self-sensing frame;
   determining whether the calculated sensing slope is larger than a slope threshold that is larger than a sensing slope of a noise sensing signal, and marking the sensing line having the sensing slope larger than the slope threshold; and
   executing a mutual scan approach on the marked sensing lines to produce a mutual sensing frame.

2. The method as claimed in claim 1, wherein before the step of executing the mutual scan approach, the method further comprises:
   determining whether a sensing value of each sensing line of the self-sensing frame is larger than a sensing threshold; and
   marking the sensing lines if the sensing value of the sensing line is larger than the sensing threshold.

3. The method as claimed in claim 2, the step of receiving the self-sensing frame comprising:
   receiving sensing values of first axis sensing lines of the self-sensing frame, wherein the first axis sensing lines have the same axis direction as driving lines of the mutual sensing frame.

4. The method as claimed in claim 3, after the step of executing the mutual scan approach, the method further comprising:
   setting multiple estimated sensing-point numbers and multiple sensing thresholds, wherein the larger the estimated sensing-point number is, the higher the sensing threshold corresponding to the estimated sensing-point number is;
   comparing a number of sensing points of each touch sensing group with the estimated sensing-point numbers to determine the size of each touch sensing group;
   selecting one of the sensing thresholds corresponding to the size of the touch sensing group; and
   defining the sensing point that is in the touch sensing group and has a sensing value larger than the selected sensing threshold as a peak sensing point.

5. The method as claimed in claim 2, after the step of executing the mutual scan approach, the method further comprising:
   setting multiple estimated sensing-point numbers and multiple sensing thresholds, wherein the larger the estimated sensing-point number is, the higher the sensing threshold corresponding to the estimated sensing-point number is;
   comparing a number of sensing points of each touch sensing group with the estimated sensing-point numbers to determine the size of each touch sensing group;
   selecting one of the sensing thresholds corresponding to the size of the touch sensing group; and
   defining the sensing point that is in the touch sensing group and has a sensing value larger than the selected sensing threshold as a peak sensing point.

6. The method as claimed in claim 1, the step of receiving the self-sensing frame comprising:
   receiving sensing values of first axis sensing lines of the self-sensing frame, wherein the first axis sensing lines have the same axis direction as driving lines of the mutual sensing frame.

7. The method as claimed in claim 6, after the step of executing the mutual scan approach, the method further comprising:
   setting multiple estimated sensing-point numbers and multiple sensing thresholds, wherein the larger the estimated sensing-point number is, the higher the sensing threshold corresponding to the estimated sensing-point number is;
   comparing a number of sensing points of each touch sensing group with the estimated sensing-point numbers to determine the size of each touch sensing group;
   selecting one of the sensing thresholds corresponding to the size of the touch sensing group; and
   defining the sensing point that is in the touch sensing group and has a sensing value larger than the selected sensing threshold as a peak sensing point.

8. The method as claimed in claim 1, after the step of executing the mutual scan approach, the method further comprising:
   setting multiple estimated sensing-point numbers and multiple sensing thresholds, wherein the larger the estimated sensing-point number is, the higher the sensing threshold corresponding to the estimated sensing-point number is;
   comparing a quantity of sensing points of each touch sensing group with the estimated sensing-point numbers to determine the size of each touch sensing group;
   selecting one of the sensing thresholds corresponding to the size of the touch sensing group; and
   defining the sensing point that is in the touch sensing group and has a sensing value larger than the selected sensing threshold as a peak sensing point.

* * * * *